United States Patent [19]
Enomoto

[11] Patent Number: 5,854,935
[45] Date of Patent: Dec. 29, 1998

[54] PROGRAM TRANSFORMATION SYSTEM FOR MICROCOMPUTER AND MICROCOMPUTER EMPLOYING TRANSFORMED PROGRAM

[75] Inventor: Toshio Enomoto, Tokyo, Japan

[73] Assignee: NEC Corporation, Tokyo, Japan

[21] Appl. No.: 729,853

[22] Filed: Oct. 15, 1996

[30] Foreign Application Priority Data

Oct. 18, 1995 [JP] Japan .................................. 7-268912

[51] Int. Cl.⁶ ...................................................... G06F 9/45
[52] U.S. Cl. ............................................................. 395/709
[58] Field of Search .................................. 395/705, 707, 395/708, 709

[56] References Cited

FOREIGN PATENT DOCUMENTS 5-250269  9/1993  Japan ........................................... 9/45

Primary Examiner—James P. Trammell
Assistant Examiner—Peter J. Corcoran, III
Attorney, Agent, or Firm—Scully, Scott, Murphy & Presser

[57] ABSTRACT

An optimization compiler performs computation of hamming's distance between address of respective instruction of the temporarily arranged program string and a next execution address after temporary arrangement of program modules. Next, the optimization compiler checks whether a portion of the program string where address distance is smaller than a predetermined value has been optimized in the temporarily arranged program string. If not optimized, modifying process of branching condition or so forth for the instruction is performed. Finally, the optimization compiler further checks whether a portion of the program string where address distance is greater than or equal to the predetermined value. If not optimized, rearrangement of the program modules is performed.

9 Claims, 17 Drawing Sheets

FIG. 9

| SERIAL ADDRESS | ADDRESS | HAMMING'S DISTANCE TO NEXT ADDRESS | HAMMING'S DISTANCE TO SERIAL ADDRESS 10 |
|---|---|---|---|
| 0 | 0 0 0 0 0 0 0 0 | 1 | 4 |
| 1 | 0 0 0 1 0 0 0 0 | 1 | 3 |
| 2 | 0 0 1 1 0 0 0 0 | 1 | 2 |
| 3 | 0 0 1 0 0 0 0 0 | 1 | 3 |
| 4 | 0 1 1 0 0 0 0 0 | 1 | 2 |
| 5 | 0 1 1 1 0 0 0 0 | 1 | 1 |
| 6 | 0 1 0 1 0 0 0 0 | 1 | 2 |
| 7 | 0 1 0 0 0 0 0 0 | 1 | 3 |
| 8 | 1 1 0 0 0 0 0 0 | 1 | 2 |
| 9 | 1 1 0 1 0 0 0 0 | 1 | 1 |
| 10 | 1 1 1 1 0 0 0 0 | 1 | 0 |
| 11 | 1 1 1 0 0 0 0 0 | 1 | 1 |
| 12 | 1 0 1 0 0 0 0 0 | 1 | 2 |
| 13 | 1 0 1 1 0 0 0 0 | 1 | 1 |
| 14 | 1 0 0 1 0 0 0 0 | 1 | 2 |
| 15 | 1 0 0 0 0 0 0 0 | 1 | 3 |

| SERIAL ADDRESS | ADDRESS | HAMMING'S DISTANCE TO NEXT ADDRESS | HAMMING'S DISTANCE TO SERIAL ADDRESS 10 |
|---|---|---|---|
| 0  | 0 0 0 0 0 0 0 0 | 1 | 2 |
| 1  | 0 0 0 0 0 0 0 1 | 2 | 3 |
| 2  | 0 0 0 0 0 0 1 0 | 1 | 1 |
| 3  | 0 0 0 0 0 0 1 1 | 3 | 2 |
| 4  | 0 0 0 0 0 1 0 0 | 1 | 3 |
| 5  | 0 0 0 0 0 1 0 1 | 2 | 4 |
| 6  | 0 0 0 0 0 1 1 0 | 1 | 2 |
| 7  | 0 0 0 0 0 1 1 1 | 4 | 3 |
| 8  | 0 0 0 0 1 0 0 0 | 1 | 1 |
| 9  | 0 0 0 0 1 0 0 1 | 2 | 2 |
| 10 | 0 0 0 0 1 0 1 0 | 1 | 0 |
| 11 | 0 0 0 0 1 0 1 1 | 3 | 1 |
| 12 | 0 0 0 0 1 1 0 0 | 1 | 2 |
| 13 | 0 0 0 0 1 1 0 1 | 2 | 3 |
| 14 | 0 0 0 0 1 1 1 0 | 1 | 1 |
| 15 | 0 0 0 0 1 1 1 1 | 5 | 2 | b

FIG.14

TEMPORARY ARRANGEMENT OUTPUT

| HAMMING'S DISTANCE TO NEXT EXECUTION ADDRESS | | ADDR | NEEMONIC | | OPERATION |
|---|---|---|---|---|---|
| | | | ORG | 0000H | |
| 1 | START: | 0000 | MOV | M00,#03 | ; mem00 ← #03 |
| 1 | LOOP1: | 0001 | IN | M01,PA | ; mem01 ← port A |
| 1 | | 0002 | ADD | M01,M01 | ; mem01 ← mem01+mem01 |
| 1 | | 0003 | DEC | M00,#01 | ; mem00 ← mem00−#01 |
| 1 | | 0004 | SLTI | M00,#01 | ; if mem00 < #01 then skip |
| 3 | | 0005 | BR | LOOP1 | ; branch LOOP1 |
| 3 | | 0006 | BR | NEXT1 | ; branch NEXT1 |
| | | | SUSPENDED | | |
| 1 | NEXT1: | 0200 | SGEI | M01,#10 | ; if mem01 ≧ #10 then skip |
| 2 | | 0201 | BR | LBL1 | ; branch LBL1 |
| 1 | | 0202 | OUT | PB,#0FFH | ; port B ← #0FFH |
| 2 | | 0203 | BR | LBL2 | ; branch LBL2 |
| 1 | LBL1 : | 0204 | OUT | PB,#00H | ; port B ← #00H |
| 1 | LBL2 : | 0205 | MOV | M01,#00 | ; mem01 ← #00 |
| | | | END | | |

FIG.15

LOCAL OPTIMIZATION OUTPUT

|  |  |  |  | OPERATION |
|---|---|---|---|---|
|  | ORG | 0000H |  |  |
| START: | 0000 | MOV | M00,#03 | ;mem00 ← #03 |
|  | 0001 | IN | M01,PA | ;mem01 ← port A |
| LOOP1: | 0002 | DEC | M00,#01 | ;mem00 ← mem00−#01 |
|  | 0003 | SGEI | M00,#00 | ;if mem00 ≧ #00 then skip |
|  | 0004 | BR | NEXT1 | ;branch NEXT1 |
|  | 0005 | ADD | M01,M01 | ;mem01 ← mem01+mem01 |
|  | 0006 | BR | LOOP1 | ;branch LOOP1 |

SUSPENDED

| NEXT1: | 0200 | SGEI | M01,#10 | ;if mem01 ≧ #10 then skip |
|---|---|---|---|---|
|  | 0201 | OUT | PB,#00H | ;port B ← #00H |
|  | 0202 | SLTI | M01,#10 | ;if mem01 < #10 then skip |
|  | 0203 | OUT | PB,#0FFH | ;port B ← #0FFH |
|  | 0204 | MOV | M01,#00 | ;mem01 ← #00 |
|  |  | END |  |  |

HAMMING'S DISTANCE TO NEXT EXECUTION ADDRESS 1
1
1
1
2
1
1

GLOBAL OPTIMIZATION OUTPUT

| HAMMING'S DISTANCE TO NEXT EXECUTION ADDRESS | | | | | OPERATION |
|---|---|---|---|---|---|
| | | ORG | 0000H | | |
| | START: | 0000 | MOV | M00,#03 | ;mem00 ← #03 |
| 1 | | 0001 | IN | M01,PA | ;mem01 ← port A |
| 1 | LOOP1: | 0002 | DEC | M00,#01 | ;mem00 ← mem00−#01 |
| 1 | | 0003 | SGEI | M00,#00 | ;if mem00 ≧ #00 then skip |
| 1 | | 0004 | BR | NEXT1 | ;branch NEXT1 |
| 1 | | 0005 | ADD | M01,M01 | ;mem01 ← mem01+ mem01 |
| 1 | | 0006 | BR | LOOP1 | ;branch LOOP1 |
| | | SUSPENDED | | | |
| 1 | NEXT1: | 0204 | SGEI | M01,#10 | ;if mem01 ≧ #10 then skip |
| 1 | | 0205 | OUT | PB,#00H | ;port B ← #00H |
| 1 | | 0206 | SLTI | M01,#10 | ;if mem01 < #10 then skip |
| 1 | | 0207 | OUT | PB,#0FFH | ;port B ← #0FFH |
| 1 | | 0208 | MOV | M01,#00 | ;mem01 ← #00 |
| | | | END | | |

PROGRAM TRANSFORMATION SYSTEM FOR MICROCOMPUTER AND MICROCOMPUTER EMPLOYING TRANSFORMED PROGRAM

BACKGROUND OF THE INVENTION

1. Field of the Invention

The present invention relates generally to a program transformation system for a microcomputer and the microcomputer employing a transformed program. More specifically, the invention relates to a program transformation system for a microcomputer adapted to addressing using a gray code and the microcomputer employing a transformed program.

2. Description of the Related Art

A gray code is a code having data differentiated from immediately preceding and immediately following codes in only one bit. Since shifting of codes is variation of only one bit, a value expressed by the code in the vicinity of variation point is the value of either immediately preceding code or immediately following code, and may not take other value.

As an example of application of the gray code for a microcomputer system, there is a method using the gray code for an address signal to an external memory of a general purpose microcomputer. The method has been described in detail in Japanese Unexamined Patent Publication (Kokai) No. Heisei 5-250269.

In the disclosed method, access of memory is performed employing the gray code having a hamming's distance of "1". Here, the hamming's distance means a number of corresponding bits having different values (such as "1" and "0" or "0" and "1") when two binary codes having same bit numbers are compared.

In this method, a power source noise associating with current variation upon switching of address is reduced and whereby a crosstalk between signal lines is reduced by reducing number of simultaneously varying bits of the address signal in the case where continuous addresses of the memory are accessed.

FIG. 17 shows a construction of the conventional microcomputer 2. The microcomputer 2 is constructed with a buffer 21, an ALU (arithmetic and logic unit) 22, a register group 23, an address output portion 24, an instruction register 25 and an instruction decoder 26.

The buffer 21 is externally connected with a data bus 201, and the address output portion 24 is externally connected to an address bus 202. The instruction decoder is externally connected with a control bus 200.

On the other hand, within the microcomputer 2, the buffer 21, the ALU 22, the register group 23 and the instruction register 25 are connected by an internal bus 203. Here, the instruction decoder 26 decodes an instruction input via the control bus 200 or the instruction input via the instruction register 24, and outputs a CPU (central processing unit) control signal 204.

In addressing for the memory, the gray code is used in the address output to external memory (not shown) from the address output portion 24 via the address bus 202. Then, access to the external memory is performed with the address.

In the conventional microcomputer system as set forth above, addressing of the memory is simply performed with the gray code. Therefore, it is significantly effective for accessing of second cache external to the microprocessor or access to data arranged in a continuous address space, such as access to a main memory device external thereof.

However, since addresses jumps in other case, namely, two or more bites variation can be cased between the address containing the instruction to be executed in the next time and the executed address immediately preceding thereto, employing of the gray code is not sufficiently effective for reducing noise due to crosstalk or power source variation.

Furthermore, in the microcomputer system, random access to the memory in the microprocessor is accepted as being limited to the inside of LSI (large scale integration circuit) and that crosstalk or power source noise is not primary cause.

In such microcomputer systems, there are not only a multi-chip microcomputer a system of a single chip microcomputer internally having a primary cache within a microprocessor and externally having secondary cache or main memory, but also a single-chip microcomputer incorporating the main memory, I/O (input/output) device, a system clock generator circuit.

In such single-chip microcomputer system, due to limitation of scale of circuit to be constructed on a single semiconductor chip and to increasing of fabrication cost, hierarchy memory as employed in the multi-chip microcomputer may not be established.

On the other hand, in general, it has been known that one third of the programs describing operation of the microcomputer system are branch instruction. In consideration of this, access to continuous memory blocks is rarely occurred in the single-chip microcomputer.

High speed characteristics is not required for the single-chip microcomputer in comparison with the multi-chip microcomputer system. However, requirement for performance in lowering of noise and lowering of power consumption is several tens times or several hundreds times severe than that in the multi-chip microcomputer system.

SUMMARY OF THE INVENTION

Therefore, it is an object of the present invention to solve the problems set forth above, and to provide a program transformation system for a microcomputer and the microcomputer using the program transformed by the system, which can realize severe requirement for performance relating to low noise and low power consumption in a single-chip microcomputer system.

According to one aspect of the invention, a program transformation system for a microcomputer for performing transformation of a source program into an object program by performing temporary arrangement of program modules depending upon results of parsing of the source program, comprises:

hamming's distance computing means for computing hamming's distances between respective instructions of a temporarily arranged program string;

local instruction modifying means for optimizing hamming's distance of the instruction by modifying instruction corresponding to a portion of the program string having an address distance smaller than a predetermined value; and global instruction modifying means for optimizing hamming's distance of the instruction by modifying instruction corresponding to a portion of the program string having an address distance greater than or equal to the predetermined value.

In the preferred construction, the hamming's distance computing means computes a hamming's distance from an address of a branching instruction and a branching destination address, and the local instruction modifying means optimize the hamming's distance of the instruction by modifying branching instruction. On the other hand, the optimization of the hamming's distance for the portion of the program string having an address distance smaller than a predetermined value, may be performed by at least one of branching condition modifying means for modifying the branching condition, syntax modifying means for modifying syntax of the instruction to equivalent syntax and instruction insertion means for inserting a predetermined instruction at a position next to the instruction to be optimized. Also, the global optimization of the hamming's distance is performed by rearranging program modules.

In practice, the optimization of the hamming's distance may be obtained by making the hamming's distance to "1".

The program transformation system may perform deletion of comment data, registering of label name in a label table, modifying the instruction into an intermediate code or registering a parameter name in a parameter name depending upon a result of parsing, and thereafter, temporary arrangement is performed.

In the preferred construction, the program transformation system further comprises outputting means for modifying the label, computing of real address and generating an object code from said intermediate code on the basis of content of modification of the program after termination of optimization.

According to another aspect of the invention, a microcomputer for executing an object program transformed from a source program by temporary arrangement of program modules depending upon result of parsing of the source program, comprises:

storage means for storing the object program having optimized hamming's distance between addresses of respective instructions of the temporarily arranged program string; and address generating means for sequentially generating addresses with optimized hamming's distances upon execution of the object program.

The address generating means may generate gray code on the basis of instruction read out from the storage means and perform addressing of a storage means with the gray code.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings:

FIG. 9 is an illustration showing variation of an address in a gray code addressing;

FIG. 14 is an illustration showing one embodiment of a program for temporary arrangement output according to the present invention;

FIG. 15 is an illustration showing a program for local optimization with respect to an example of program of FIG. 11;

FIG. 16 is an illustration showing a program for global optimization with respect to an example of program of FIG. 11.

DESCRIPTION OF THE PREFERRED EMBODIMENT

The present invention will be described hereinafter in terms of the preferred embodiment with reference to the accompanying drawings, FIGS. 1 to 16. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

At first, operation of the present invention will be discussed.

Upon transforming from a source program into an object program by an optimization compiler for locally optimizing a portion having large hamming's distance and an address distance smaller than a predetermined value and for globally optimizing a portion having large hamming's distance and the address distance greater than or equal to the predetermined value, to make the hamming's distance to be "1", to make it possible to sequentially execute the transformed object program with the minimum hamming's distance "1" even when the addresses of the transformed object program for operating the microcomputer are not the gray code address where the addresses of the program to be executed is not sequential.

Therefore, even with the single-chip microcomputer not having hierarcally organized memory, power source noise associated with variation of the address signal or crosstalk can be reduced.

Furthermore, variation speed at the bit varying at fastest speed in the gray code addressing is one half of that of the addressing by binary code. Thus, unwanted radiation about which high performance is strictly required for the single-chip microcomputer, can be reduced. Therefore, charge transfer amount associated with address variation can be reduced to reduce current consumption.

Figure 1:
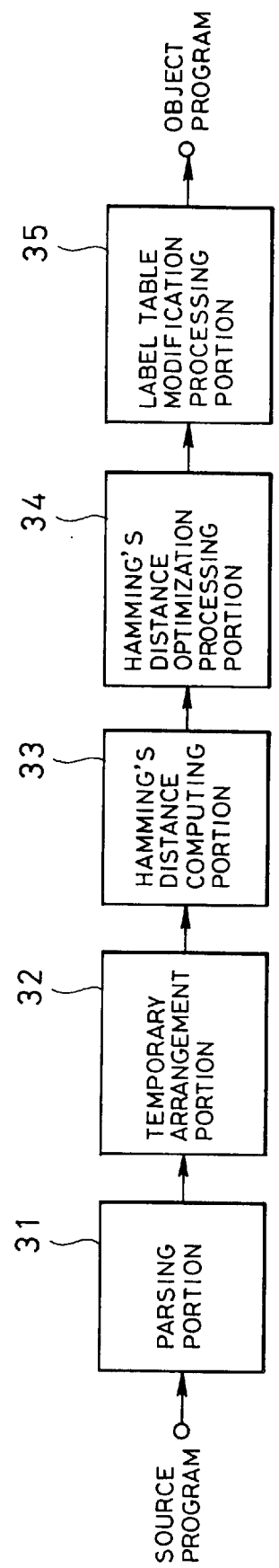
FIG. 1 is a block diagram showing a general constriction of a program transformation system for a microcomputer according to the present invention.

Next, one embodiment of the present invention will be discussed with reference to the drawings. At first, construction of one embodiment of the program transformation system for the microcomputer will be discussed. FIG. 1 is a block diagram showing a general construction of the program transformation system for the microcomputer according to the invention, FIG. 2 is a block diagram showing a construction of a hamming's distance optimization processing portion, and FIG. 3 is a block diagram showing a construction of a local instruction modification processing portion.

Referring to FIG. 1, the program transformation system for the microcomputer is constructed with a parsing portion 31 for parsing the source program, a temporarily arranging portion 32 temporarily arranging the parsed program, a hamming's distance computing portion 33 computing the hamming's distance of the temporarily arranged program string, a hamming's distance optimization processing portion 34 performing optimization of the hamming's distance, and a label table modification processing portion 35 performing modification of a label table of the optimized program or so forth.

Figure 2:
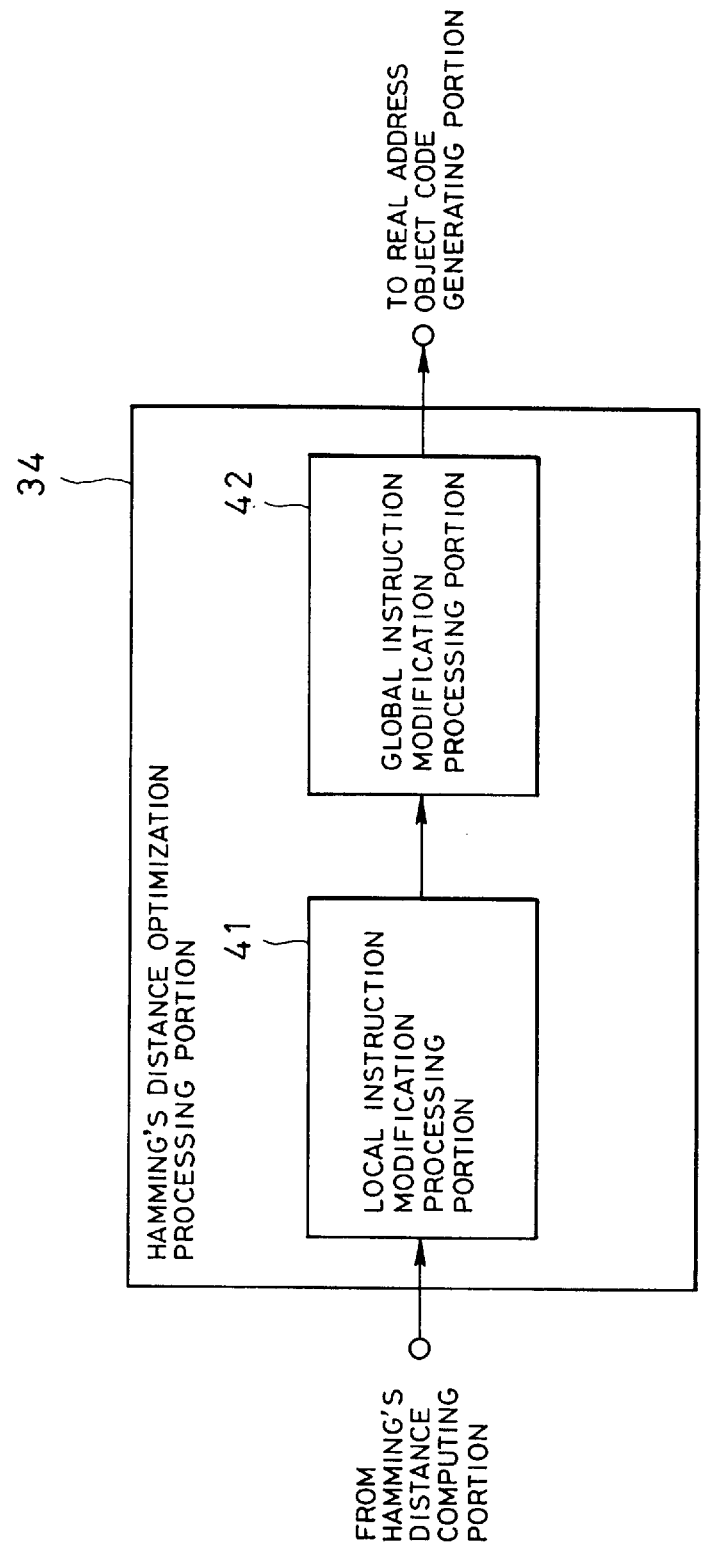
FIG. 2 is a block diagram of a hamming's distance optimization processing portion.

As shown in FIG. 2, the hamming's distance optimization processing portion 34 includes a local instruction modification processing portion 41 performing local optimization of instruction having address distance smaller than the predetermined value, and a global instruction modification processing portion 42 performing global optimization of instruction having address distance greater than or equal to the predetermined value.

Figure 3:
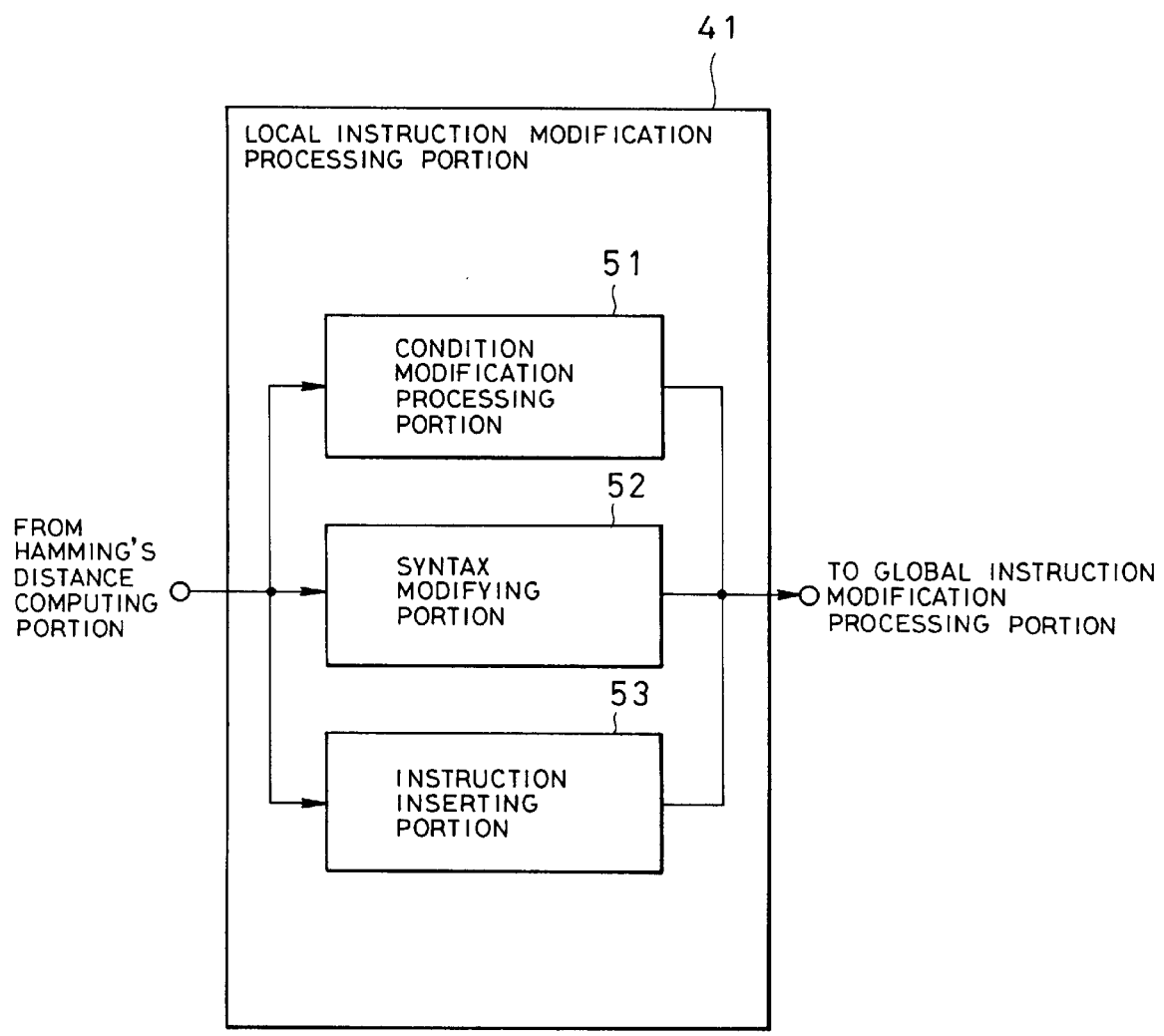
FIG. 3 is a block diagram of a local instruction modification processing portion.

As shown in FIG. 3, the local instruction modification processing portion 41 includes a condition modification processing portion 51 performing modification process of branching condition or so forth with respect to the instruction, a syntax modification processing portion 52 modifying the syntax into equivalent syntax, and an instruction insertion processing portion 53 performing insertion of the instruction.

The software running on the program transformation system for the microcomputer will be hereinafter referred to as "optimization compiler".

Figure 4:
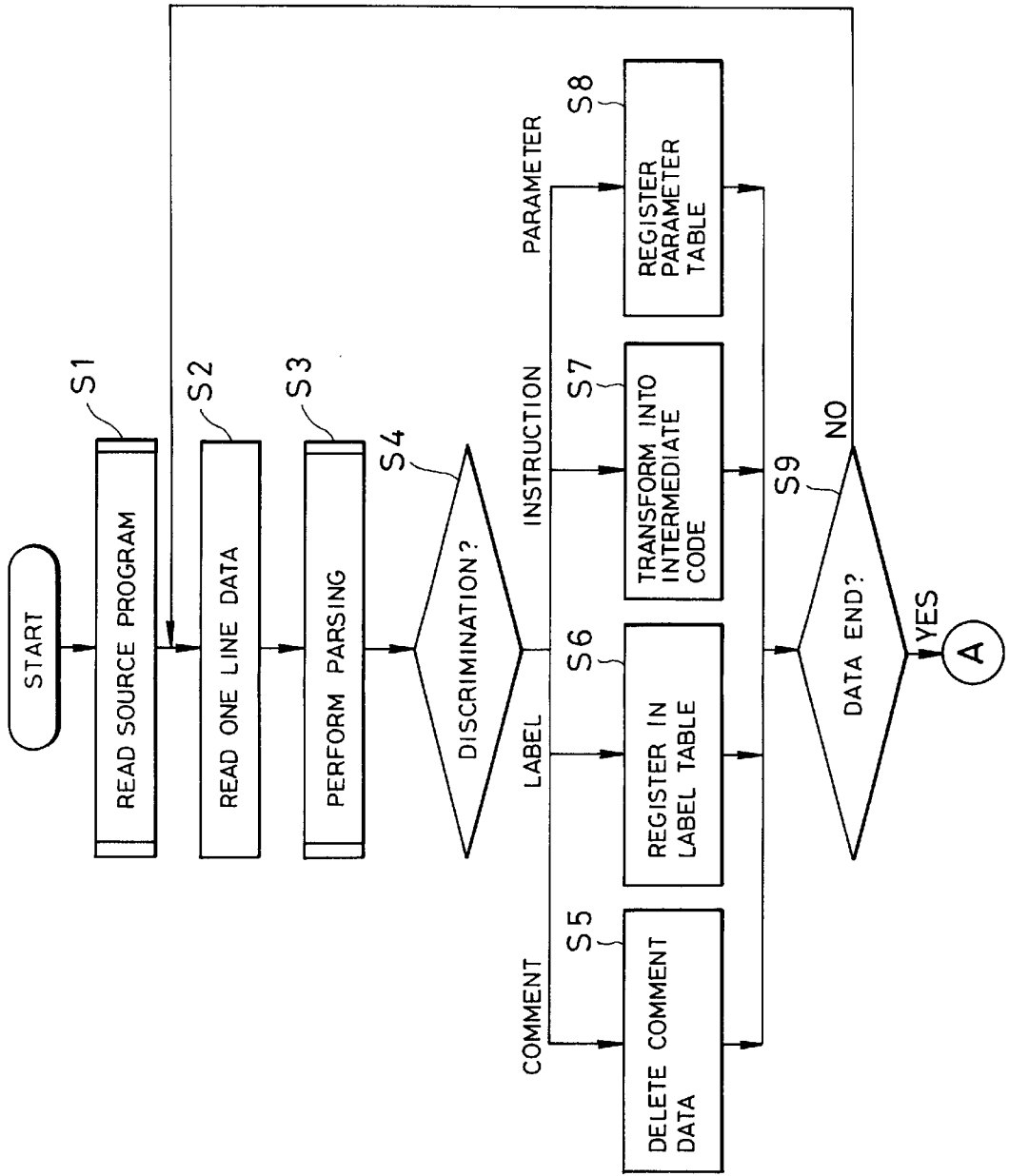
FIG. 4 is a flowchart showing one embodiment of an operation according to the present invention.
Figure 5:
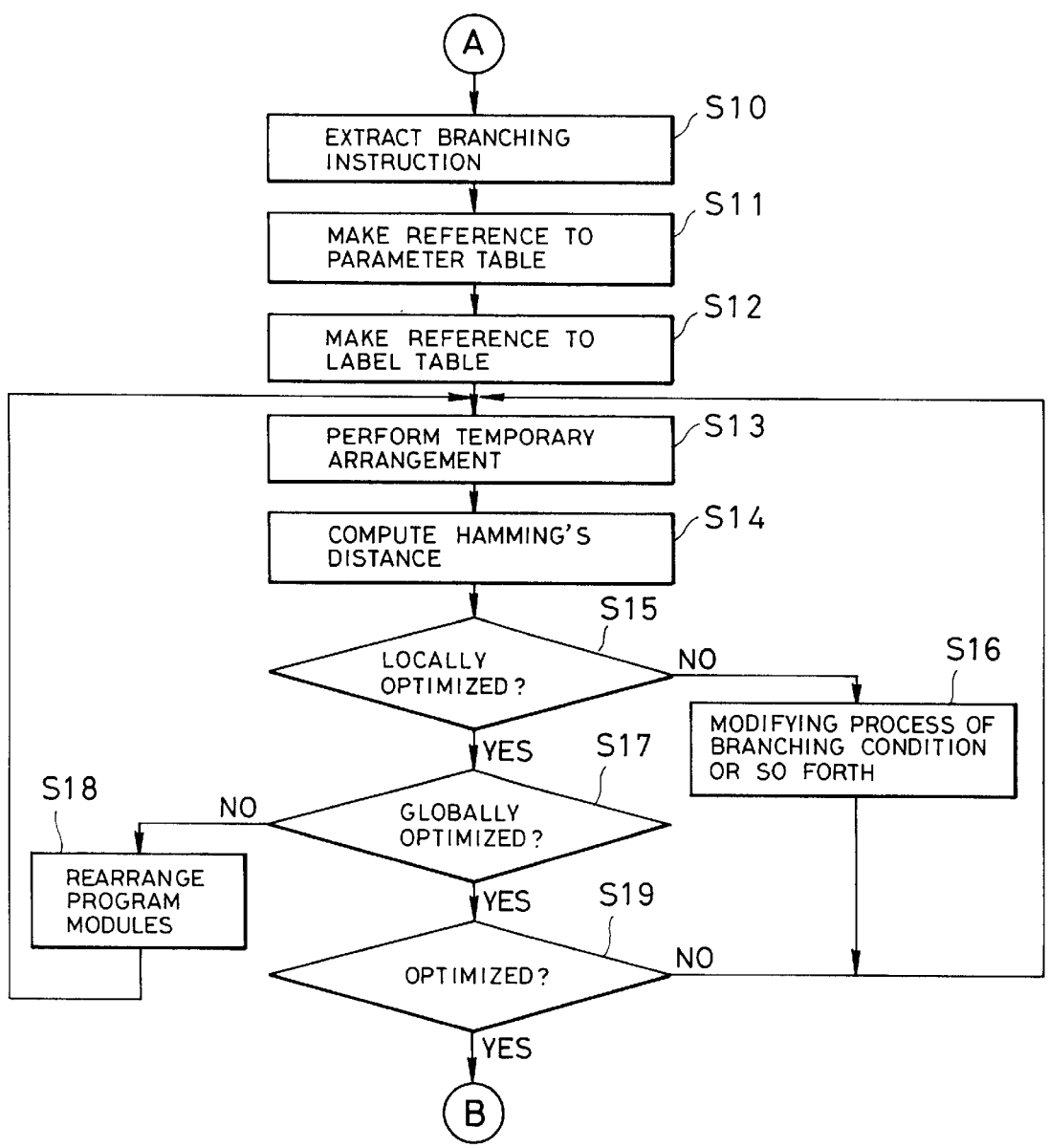
FIG. 5 is a flowchart showing one embodiment of an operation according to the present invention.
Figure 6:
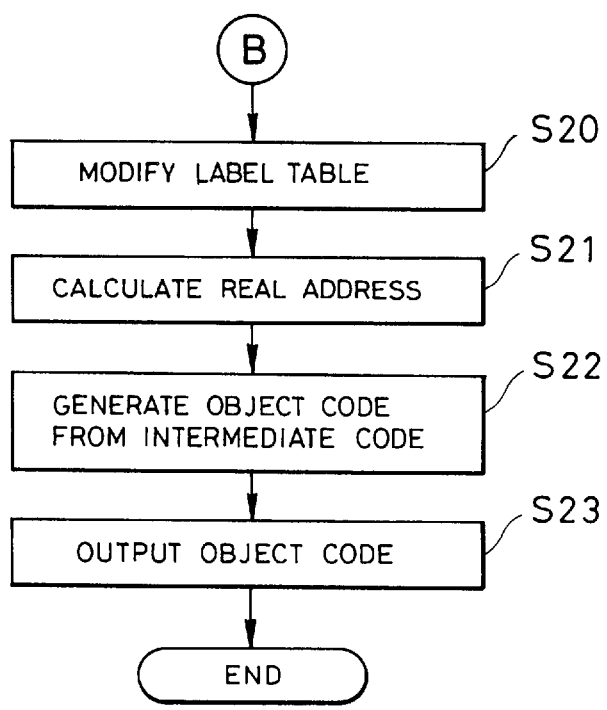
FIG. 6 is a flowchart showing one embodiment of an operation according to the present invention.
Figure 7:
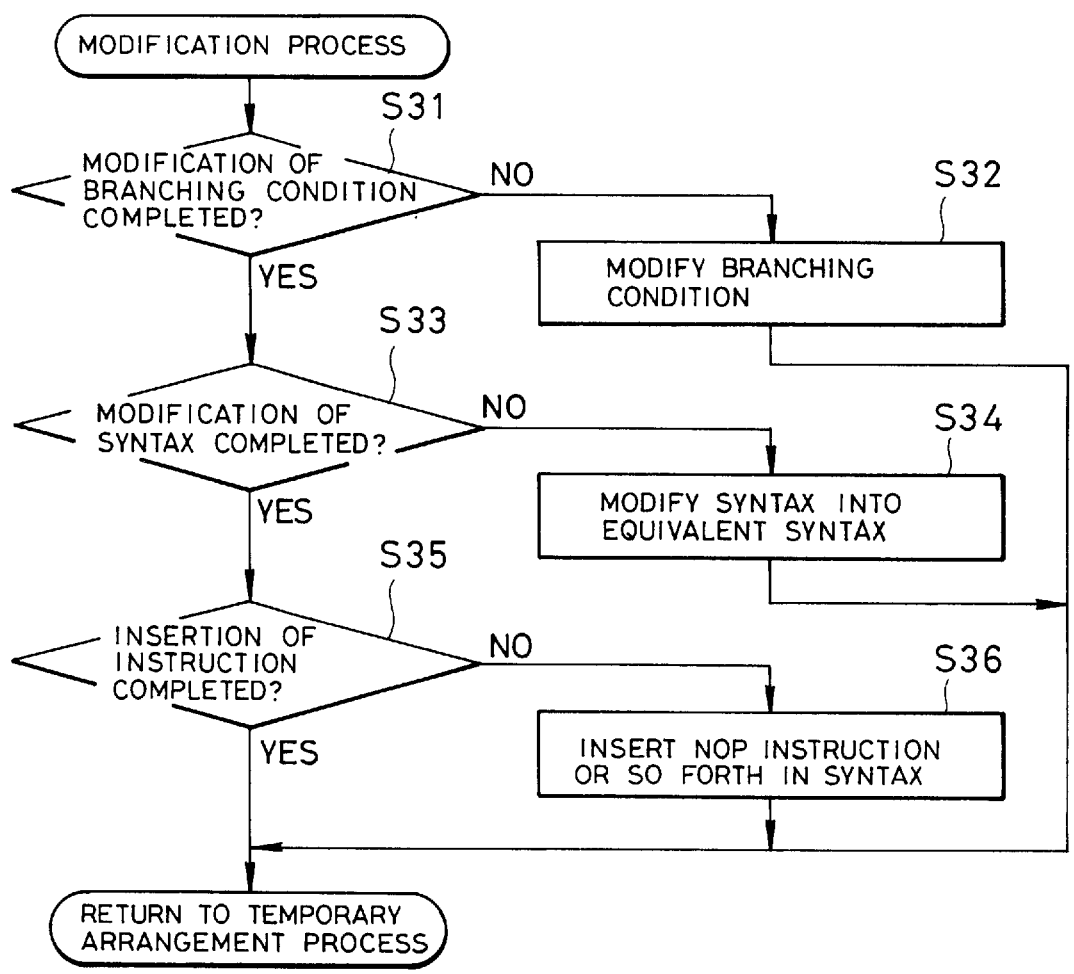
FIG. 7 is a flowchart showing modifying process of a branching condition of FIG. 3 or so forth.

FIGS. 4 to 6 are flowchart showing operation of one embodiment of the present invention. FIG. 7 is a flowchart showing a modifying process of branching condition and so forth. The operation of one embodiment of the present invention will be discussed with reference to FIGS. 4 to 7.

One embodiment of the optimization compiler according to the present invention transforms a source program into an object with a path for performing intermediate code transformation and registering parameter and label, a path for temporary arrangement and a path for performing fixation of real address and generation of object code.

Namely, when the source program is read by the parsing portion 31 (step S1 of FIG. 4), the optimization compiler reads out data for one line from the reading destination (step S2 of FIG. 4) to perform parsing of the data (step S3 of FIG. 4).

The optimization compiler discriminates the result of parsing (step S4 of FIG. 4) to delete a comment data when the result of parsing is a comment (step S5 of FIG. 4) and to register a label name to a label table (not shown) when the result of parsing is label (step S8 of FIG. 4).

On the other hand, if the result of parsing is instruction, the optimization compiler transforms the instruction into the intermediate code (step S7 of FIG. 4). Also, if the result of parsing is a parameter, a parameter name is registered in a parameter table (not shown) (step S9 of FIG. 4).

The optimization compiler repeats parsing of the data, transformation into the intermediate core (for the instruction) and registration of the parameter and label (for the parameter and label) (steps S2 to S8 of FIG. 4) until all of the data of the source program in the reading destination is processed.

When processes for parsing of the data, transformation into the intermediate code and registration of the parameter and label are completed for all of the data of the source program in the reading destination, the optimization compiler extracts branching instructions in the temporary arrangement portion 32 (step S10 of FIG. 5). Then, the optimization compiler makes reference to the parameter table and the label table (steps S11 and S12 of FIG. 5) to assign gray codes for the intermediate codes in the order of occurrence to perform temporary arrangement (step S13 of FIG. 5). Subsequently, the optimization compiler calculates hamming's distance between addresses of respective instructions in the temporarily arranged program sequence and next execution address by the hamming distance computing portion 33 (step S14 of FIG. 5).

Once the hamming's distances are calculated, the optimization compiler makes judgement whether the temporarily arranged program string is locally optimized in the temporarily arranged program string by checking whether the program modules having address distance smaller than a predetermined value is optimized or not, in the local instruction modification processing portion (step S15 of FIG. 5).

If the program string is not locally optimized, the optimization compiler performs modifying process of the branching condition or so forth for the instruction corresponding to the program module which is not locally optimized (step S16 of FIG. 5). Namely, the optimization compiler checks whether modification of the branching condition for the program module in question is completed or not (step S31 of FIG. 7).

If modification of the branching condition is not completed as checked at step S31, the branching condition is modified by the condition modification processing portion 51 (step S32 of FIG. 7), and then the process is returned to step S13 to perform temporary arrangement. In this case, for example, if the original branching condition is "A>B", the branching condition may be modified to be "A≦B".

If the modification of the branching condition has already been completed as checked at step S31, the optimization compiler checks whether a modification of syntax has been completed in the program module in question (step S33 of FIG. 7). If the modification of the syntax is not yet completed, the optimization compiler modifies the syntax with another equivalent syntax in the syntax modification processing portion 52 (step S34 of FIG. 7), and then the process is returned to step S13 to perform temporary arrangement again. In this case, when the syntax is "if then syntax" for example, the syntax is modified to be "while until syntax" which is equivalent to the former.

If modification of the syntax is completed, the optimization compiler checks whether insertion of the instruction is completed in the local program module in question (step S35 if FIG. 7). If insertion of the instruction is not completed, the optimization compiler inserts NOP (No OPeration) instruction after the instruction corresponding to the local program module in the instruction insertion processing portion 53 (step S36 of FIG. 4), and then the process is returned to step S13 to perform temporary arrangement again. Here, the NOP instruction means the instruction to perform nothing other than incrementing of the address counter by one.

When local optimization is achieved, the optimization compiler checks whether the temporarily arranged program string is globally optimized by checking whether the program modules having address distance greater than or equal to the predetermined value are optimized or not (step S17 of FIG. 5).

If global optimization is not achieved, the optimization compiler performs rearrangement of the program modules in the global instruction modification processing portion 42 (step S18 of FIG. 5). Then, the process is returned to step S13 to perform temporary arrangement.

On the other hand, when global optimization is completed, the optimization compiler checks whether all of optimization has been completed or not (step S19 of FIG. 5). If all of optimization is not completed, the process is returned to step S13 to perform temporary arrangement.

On the other hand, when all of optimization is completed, the optimization compiler performs modification of the label table on the basis of content of modification in the label table modification processing portion 35 (step S20 of FIG. 6). Then, real address is computed (step S21 of FIG. 6) and the object code is generated from the intermediate code and output the same (steps S22 and S23 of FIG. 6).

When the object program transformed from the source program as set forth above is executed by the microcomputer (not shown), since optimization of the hamming's distance (process to make the hamming's distance to one) is provided for the branching portion where the hamming's distance tends to become large, the program can be executed sequentially with minimum hamming's distance even when branching in execution of program occurs.

Figure 8:
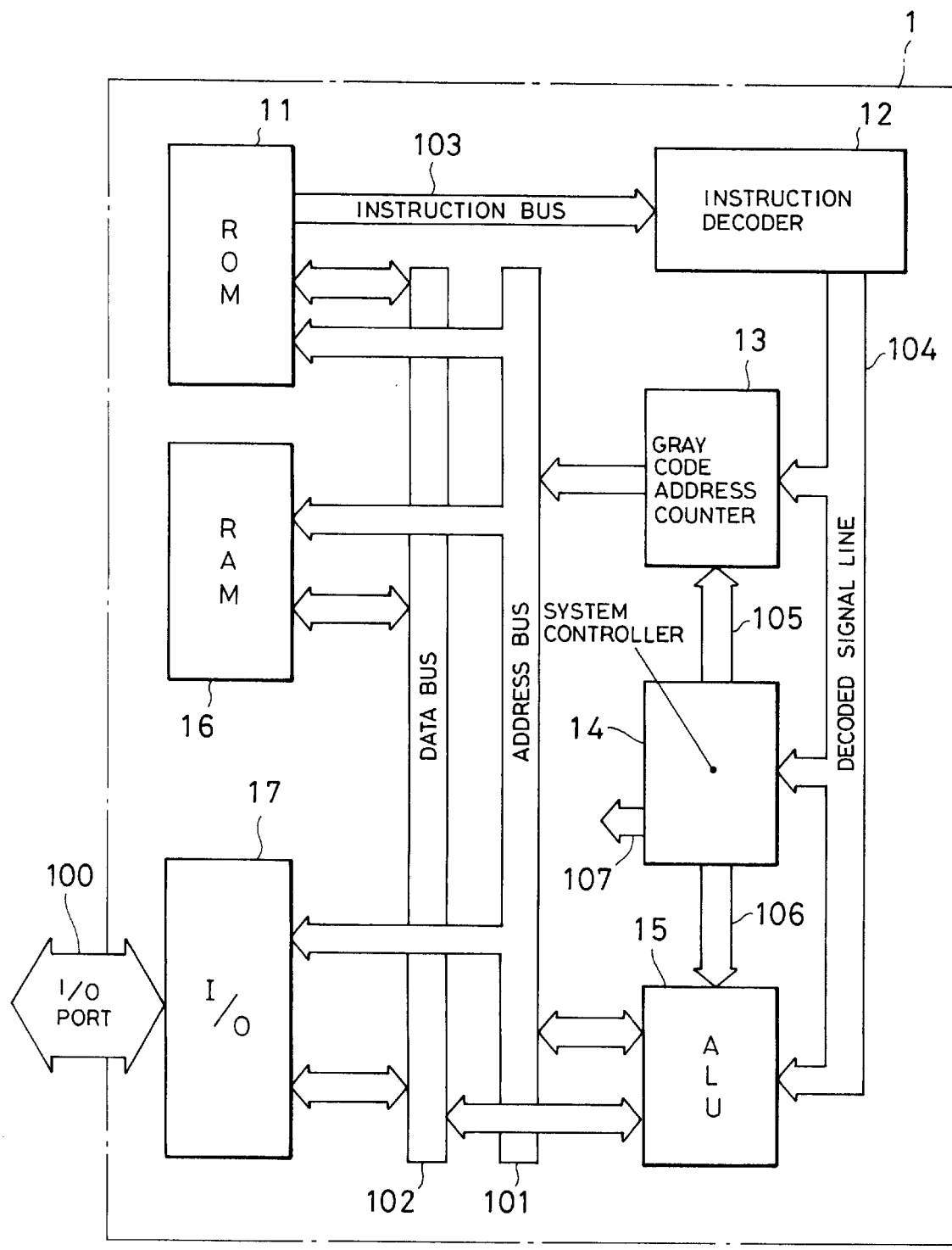
FIG. 8 is a block diagram showing a construction of one embodiment of a microcomputer according to the present invention.

FIG. 8 is a block diagram showing a construction of one embodiment of the microcomputer according to the present invention. In FIG. 8, the microcomputer 1 is constructed with a ROM (Read Only Memory) 11, an instruction decoder 12, a gray code address counter 13, a system controller 14, an ALU (Arithmetic and Logic Unit) 15, a RAM (Random Access Memory) 16 and an I/O (Input/Output) circuit 17.

In the ROM 11, the object program transformed through the process set forth above is stored. Respective instructions of the object program is out put to the instruction decoder 12 via the instruction bus 103.

The instruction decoder 12 decodes the instruction from the ROM 11. Then, the decoded signal is output to the gray code address counter 13, the system controller 14 and the ALU 15 via a decoded signal line 104.

The gray code address counter 13 normally indicates a next gray code address of the currently executed instruction, and the content is sequentially updated associating with execution of the instruction. On the other hand, when the branching instruction is executed or when the instruction is I/O access, the gray code is generated on the basis of the decoded signal from the instruction decoder 12. With the generated gray code, addressing of respective of the ROM 11, the RAM 16 and the I/O circuit 17 is performed via an address bus 101. On the other hand, the gray code from the gray code address counter 13 is supplied to the ALU 15 via the address bus 101.

The system controller 14 outputs respective control signals 105 to 107 on the basis of the decoded signal from the instruction decoder 12 to the gray code address counter 13, the ALU 15 and other circuits (not shown).

The ALU 15 performs calculation on the basis of the gray code from the gray code address counter 13 and the control signal from the system controller 14. Then, the result of calculation is output to respective of the ROM 11, the RAM 16 and the I/O circuit 17 via the address bus 101 and the data bus 102.

The RAM 16 stores the data on the data bus 102 on the basis of the address on the address bus 101. In the alternative, store data read out on the basis of the address on the address bus 101 is output on the data bus 102.

The I/O circuit 17 externally outputs the data on the data bus 102 on the basis of the address on the address bus 101. Alternatively, the data externally input on the basis of the address on the address bus 101 is output on the data bus 102. Namely, the I/O circuit 17 exchanges data with external elements.

As set forth above, since the microcomputer 1 operates according to the gray code generated by the gray code address counter 13, the program can be sequentially executed with the minimum hamming's distance even when addresses are not sequence.

Figure 10:
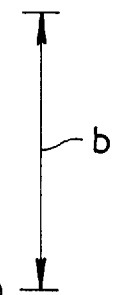
FIG. 10 is an illustration showing variation of address in addressing with a binary code.

FIG. 9 is an illustration showing variation of address in gray code addressing, and FIG. 10 is an illustration showing variation of address in addressing by binary code. Here, in these figures, sequential numbers are assigned for addresses from smaller address, for the purpose of disclosure. This number will be referred to as serial address. If there is no branching instruction, the instruction is executed in order of this serial addresses. Indeed, the memory address to be accessed will be hereinafter referred to as gray code address.

In case of the gray code addressing, the address is sequentially varied as "00000000"→"00010000"→ "00110000"→"00100000"→"01100000"→"01110000"→ "01010000"→"01000000"→"11000000"→"11010000"→ "11110000"→"11100000"→"10100000"→"10110000"→ "10010000"→"10000000", as shown in FIG. 9. On the other hand, since the hamming's distance from the preceding address is respectively "1" as the gray code. Furthermore, in consideration of the branching instruction, the hamming's distances from one address to respective addresses are, as exemplified by the hamming's distance from the serial address "10" ("11110000"), as "4", "3", "2", "3", "2", "1", "2", "3", "2", "1", "0", "1", "2", "1", "2" and "3", respectively.

On the other hand, in case of addressing with the binary code, the addresses are varied as "00000000"→ "00000001"→"00000010"→"00000011"→"00000100"→ "00000101"→"00000110"→"00000111"→"00001000"→ "00001001"→"00001010"→"00001011"→"00001100"→ "00001101"→"00001110"→"00001111", as shown in FIG. 10. On the other hand, the hamming's distances to the preceding address are varied as "1", "2", "1", "3", "1" . . . , as shown in FIG. 7.

Similarly to the above, the hamming's distances of respective addresses from the serial address "10" ("00001010") are as "2", "3", "1", "2", "3", "4", "2", "3", "1", "2", "0", "1", "2", "3", "1" and "2", respectively.

Now, the currently serial address 10 is executed, and in case of gray code addressing, the serial addresses having large the hamming's distance from the position of the serial address 10 are serial addresses relatively far from the current serial address "10". For example, the serial address 0 having the hamming's distance "4" is the serial address relatively far from the serial address 10 (see a of FIG. 9).

In contrast to this, in case of addressing by the binary code, even when the hamming's distance from the serial address 10 is large, serial addresses are relatively close. For example, the serial address 5 having the hamming's distance "4" is relatively close to the serial address 10 (see b of FIG. 10).

Figure 11:
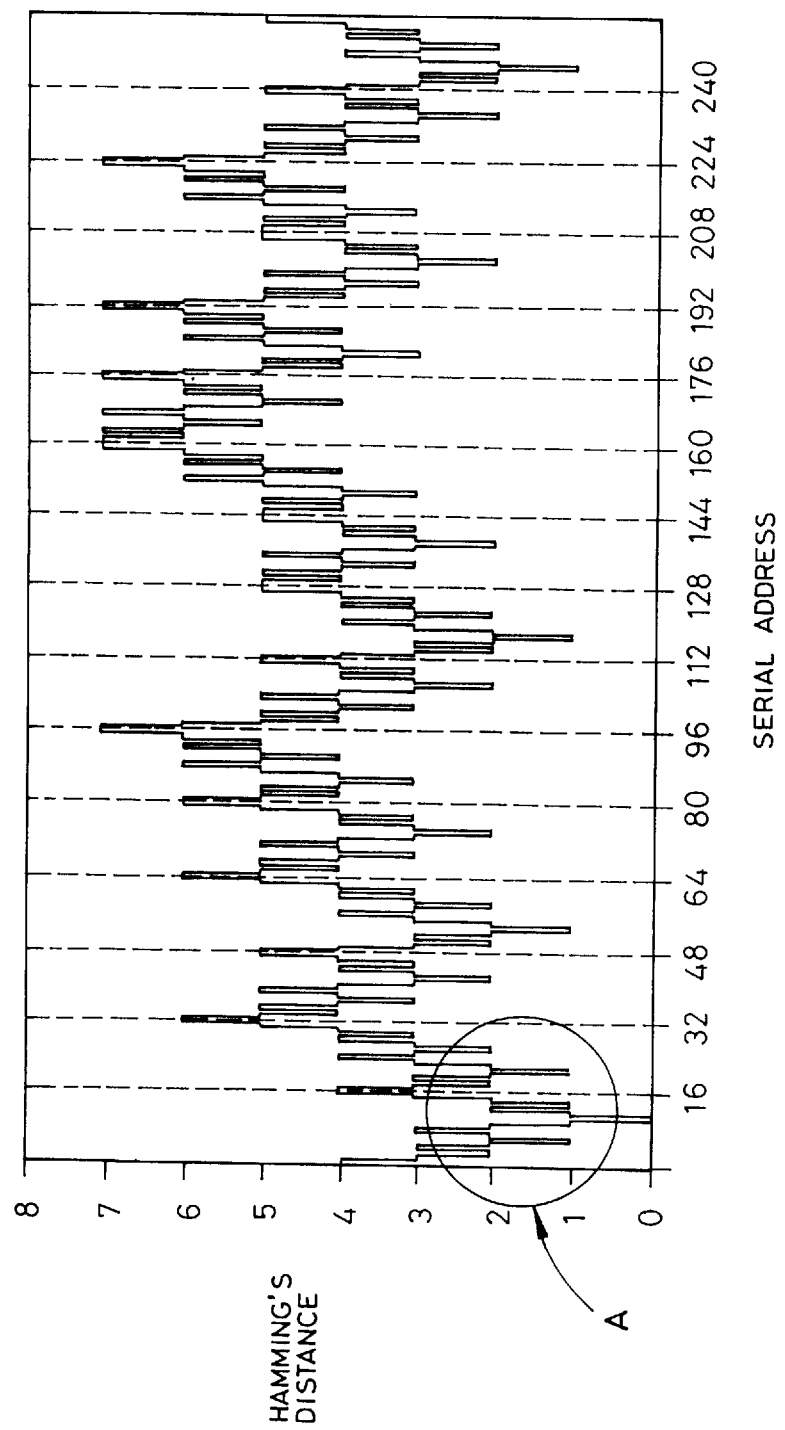
FIG. 11 is an illustration showing a hamming's address between a serial address 10 in the gray code addressing and another serial address.
Figure 12:
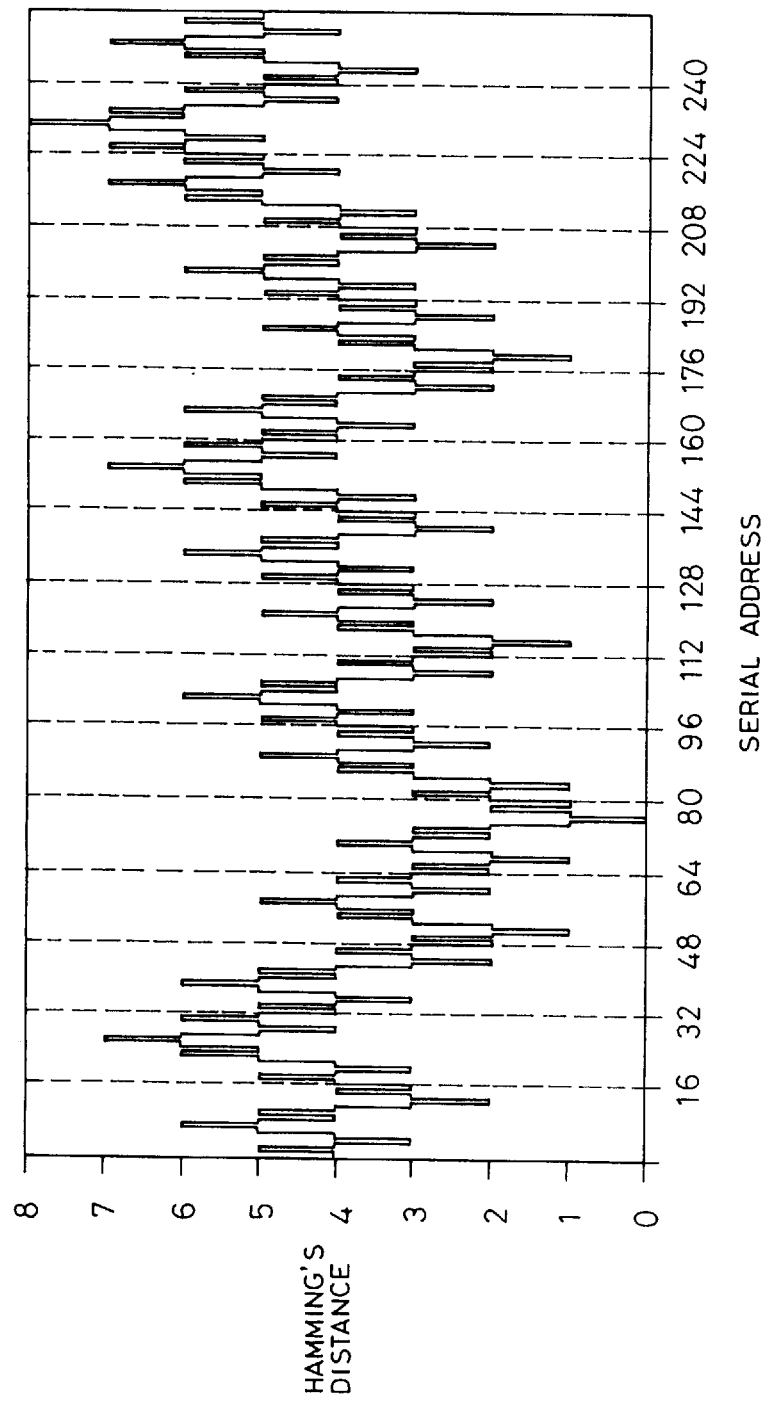
FIG. 12 is an illustration showing a hamming's address between a serial address 76 in the gray code addressing and another serial address.
Figure 13:
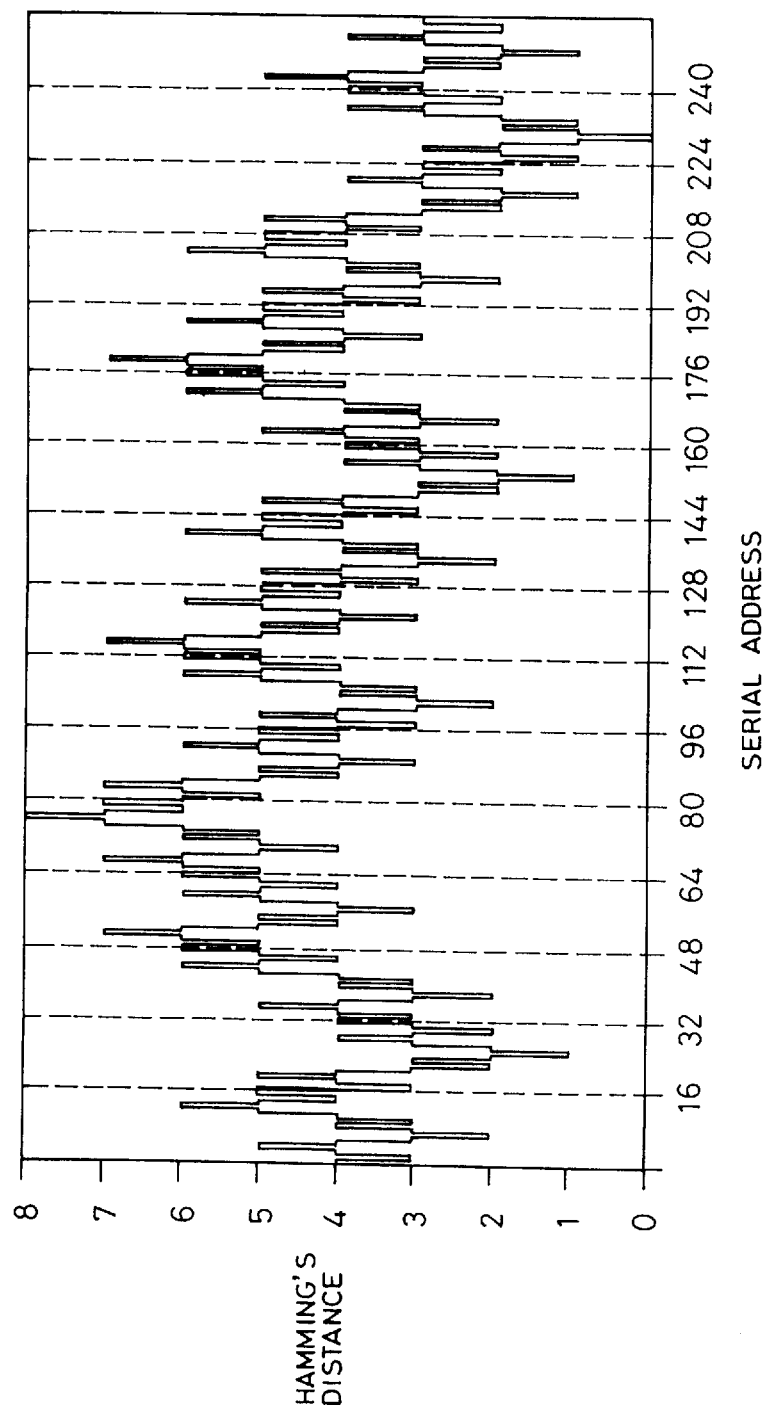
FIG. 13 is an illustration showing a hamming's address between a serial address 230 in the gray code addressing and another serial address.
Figure 17:
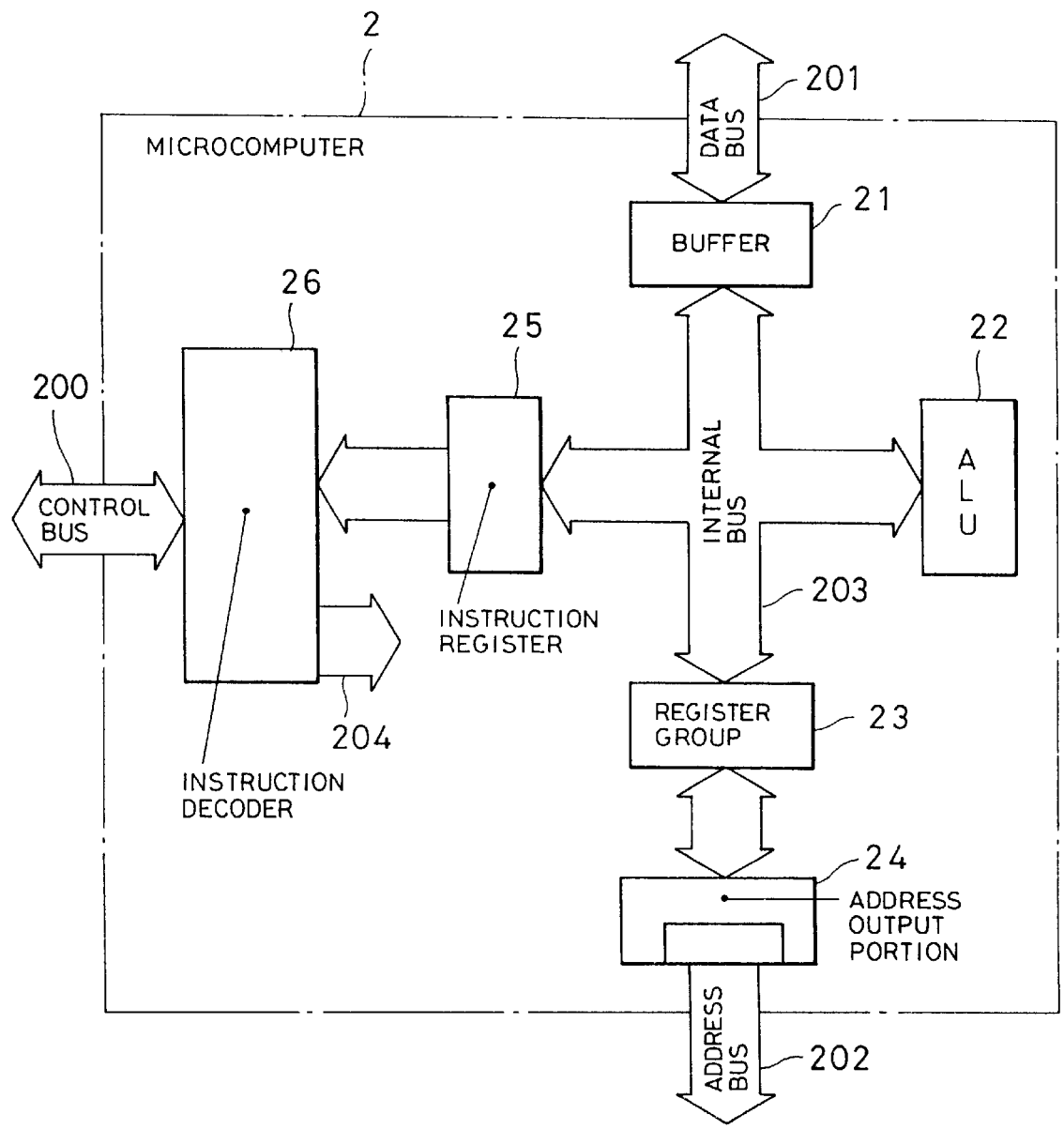
FIG. 17 is a block diagram showing a construction of the conventional microcomputer.

FIG. 11 is an illustration showing a hamming's distance between the serial address 10 ("11110000") and other serial address in the gray code addressing, FIG. 12 is an illustration showing a hamming's distance from the serial address 76 "10100110") and other serial address in gray code addressing, and FIG. 13 is an illustration showing a hamming's distance from the serial address 230 ("01011001" to other address in the gray code addressing.

In FIG. 11, while the hamming's distances are relatively small in the serial addresses close to the serial number 10, there are serial numbers far from the serial number 10 but having small hamming's distances. Even in FIGS. 12 and 13, while the hamming's distances are relatively small in the serial addresses close to the serial addresses 76 and 230, there are serial numbers far from the serial number 10 but having small hamming's distances. In general, it can be said that the foregoing characteristics is present in the arbitrary serial addresses.

In the optimization compiler generating the object program to be actually executed from the source program describing operation of one embodiment of the microcomputer according to the present invention, a process to make the characteristics of the address of gray code to be fully effective, as set forth above.

For instance, when the branching instruction is present in the serial address 10, and if the branching instruction is for local branching to proximal serial number, then the order of execution and/or evaluation of condition of the conditioned branching are modified by modification of the syntax or modification of the branching condition so that the branching destination may be placed in serial numbers 5, 9, 11, 13, 20 having hamming's distance "1".

On the other hand, then the branching instruction in the serial address 10 is global branching to jump to the serial addresses far from the serial address 10, rearrangement of the preceding and following program modules so that the branching destinations may be placed in serial numbers 53, 117, 245 having hamming's distance "1".

In either case, if the branching destination cannot be arranged at an appropriate address even by modification of the order or execution or condition evaluation of the conditioned branching or rearranging of the program modules, NOP instruction or so forth is inserted so that the branching destination can be located at an appropriate address. Thus, the object program optimized to have the hamming's distance "1" is written in the ROM 11.

FIG. 14 is an illustration showing an example of the program of a temporarily rearranging in the shown embodiment of the present invention, FIG. 15 is an illustration showing a program generated through local optimization of the program of FIG. 14, and FIG. 16 is an illustration showing a program generated through global optimization of the program of FIG. 14.

Optimization process of the program by one embodiment of the present invention will be discussed with reference to FIGS. 14 to 16. It should be noted that while FIGS. 14 to 16 are illustrated by assembler expression for facilitating understanding, they should be expressed in intermediate language to be used in respective compiler, in practice. Even with the assembler expression, essence of the optimization of the program will never be changed. On the other hand, hamming's distance between the address used in the assembler expression and address used in FIGS. 14 to 16 and between the address used in the assembler expression and the next execution address are used for convenience in explaining process of optimization.

FIG. 14 is a temporarily arranged program before optimization. The figure in each line of the program at the left side end is a hamming distance to the next execution address. Observing the hamming's distance, it should be appreciated that the hamming's distance becomes large at the portion of the branching instruction. It should be noted that, on the left side ends of the locally optimized program of FIG. 15 and the globally optimized program of FIG. 16, the hamming's distances are also indicated.

The optimization process for the above-mentioned program, at first, parses the process content with paying attention for the portion having branching instruction with large hamming's distance in order to perform local optimization for the portion having address distance less than 256 bites.

As a result of parsing, a process of "if then" of the program in line 5 of the front half of the temporarily arranged program before optimization is replaced with equivalent "while until" process to calculate hamming's distance to take one of the processes having lesser hamming's distance ("while until" process in this case").

Namely, the "if then" process

```
LOOP 1:   0002 ADD M01, M01
              ; mem01 ← mem01 + mem01
          0003 DEC M01, #01
              ; mem00 ← mem00 – #01
          0004 SLTI M00, #01
              ; if mem00 < #01 then skip
          0005 BR LOOP1
              ; branch LOOP1
          0006 BR NEXT1
              ; branch NEXT1
``` is replaced with "while until" process of

```
LOOP 1:   0002 DEC M00, #01
              ; mem01 ← mem00, #01
          0003 SEGI M00, #00
              ; if mem00 ≧ #00 then skip
          0004 BR NEXT1
              ; branch NEXT1
          0005 ADD M01, M01
              ; mem01 ← mem01 + mem01
          0006 BR LOOP1
              ; branch LOOP1
```

On the other hand, the later half of the temporarily arranged program before optimization has a combined syntax of skipping instruction and branching instruction. Such syntax is replaced with an equivalent syntax containing only skip instruction.

Namely, the process as

```
NEXT1:    0200 SEGI M01, #01
              ; if mem01 ≧ #01 then skip
          0201 BR LBL1
              ; branch LBL1
          0202 OUT PB, #0FFH
              ; Port B ← #0FFH
          0203 BR LBL2
              ; branch LBL2
```

| | |
|---|---|
| LBL1 | 0204 OUT PB, #00H |
| | ; Port B ← #00H |
| LBL2 | 0205 MOV M01, #01 |
| | ; mem01 ← #00 | is modified to the process as

| | |
|---|---|
| NEXT1: | 0200 SEGI M01, #10 |
| | ; if mem01 ≧ #10 then skip |
| | 0201 OUT PB, #00H |
| | ; Port B ← #00H |
| | 0202 STLI M01, #10 |
| | ; if mem01 < #10 then skip |
| | 0203 OUT PB, #0FFH |
| | ; Port B ← #0FFH |
| | 0204 MOV M01, #00 |

In this case, the instruction immediately after skip instruction becomes the operation of the instruction per se or NOP operation depending upon skip condition. Therefore, the hamming's distance "1" of address variation is certainly maintained. The program to be obtained by the foregoing modification is the locally optimized program shown in FIG. 15.

Next, global optimization is performed for program modules having address distance greater than or equal to 256 bites. Major method of the global optimization is rearrangement per modules. The program shown in FIG. 15, the branch to NEXT1 where the hamming's distance is "2", the modules following NEXT1 are rearranged from the address 0204H to optimize to the hamming's distance "1".

Namely, the module

| | |
|---|---|
| NEXT1 | 0200 SEGI M01, #10 |
| | ; if mem01 ≧ #10 then skip |
| | 0201 OUT PB, #00H |
| | ; Port B ← #00H |
| | 0202 STLI M01, #10 |
| | ; if mem01 < #10 then skip |
| | 0203 OUT PB, #0FFH |
| | ; Port B ← #0FFH |
| | 0204 MOV M01, #00 |
| | ; mem01 ← #00 | is rearranged from address 0204H as

| | |
|---|---|
| NEXT1: | 0204 SEGI M01, #10 |
| | ; if mem01 ≧ #10 then skip |
| | 0205 OUT PB, #00H |
| | ; Port B ← #00H |
| | 0206 STLI M01, #10 |
| | ; if mem01 < #10 then skip |
| | 0207 OUT PB, #0FFH |
| | ; Port B ← #0FFH |
| | 0208 MOV M01, #00 |
| | ; mem01 ← #00 |

The program obtained through the foregoing modification process is the globally optimized program shown in FIG. 16.

Thus, upon transformation of the source program into the object program by the optimization compiler, by performing optimization for the portion of the program having large hamming's distance and having address distance smaller than the predetermined value, and by performing optimization for the portion of the program having large hamming's distance and having address distance greater than or equal to the predetermined value, for making the hamming's distance "1". When the microcomputer 1 is operated with the transformed object program, even when the program is not executed with sequence of addresses, it can be executed sequentially with the minimum hamming's distance "1".

Therefore, even in the single-chip microcomputer not having hierarchal memory, power source noise associating with variation of the address signal or crosstalk can be reduced.

Furthermore, the gray code addressing has variation speed of the bit varying at fastest timing becomes one half of the addressing by binary coding. Thus, unwanted radiation for which the performance as the single-chip microcomputer is strictly required, can be reduced, and whereby the charge transfer amount associating with address variation can be reduced to reduce current consumption.

As set forth above, according to the present invention, upon transformation of the source program into the object program to be executed by performing rearranging depending upon the result of parsing of the source program, by computing hamming's distance between addresses of respective instructions of the rearranged program string, locally optimizing the hamming's distance of the instruction corresponding to the portion of the program where the address distance is smaller than the predetermined value with at least varying branching condition, and globally optimizing hamming's distance of the instruction corresponding to the portion of the program where the address distance is greater than or equal to the predetermined value with performing rearrangement of the program modules, even in the single-chip microcomputer not having hierarchal memory, power source noise associating with variation of the address signal or crosstalk can be reduced.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A program transformation system for a microcomputer for performing transformation of a source program into an object program by performing temporary arrangement of program modules depending upon results of parsing of the source program, comprising:

hamming's distance computing means for computing hamming's distances between respective instructions of a temporarily arranged program string;

local instruction modifying means for optimizing hamming's distance of the instruction by modifying instruction corresponding to a portion of the program string having an address distance smaller than a predetermined value; and global instruction modifying means for optimizing hamming's distance of the instruction by modifying instruction corresponding to a portion of the program string having an address distance greater than or equal to the predetermined value.

2. A program transformation system for a microcomputer as set forth in claim 1, wherein said hamming's distance computing means computes a hamming's distance from an address of a branching instruction and a branching destination address, and said local instruction modifying means optimize the hamming's distance of the instruction by modifying branching instruction.

3. A program transformation system for a microcomputer as set forth in claim 1, wherein the optimization of the hamming's distance for said portion of the program string having an address distance smaller than a predetermined value, is performed by at least one of branching condition modifying means for modifying said branching condition, syntax modifying means for modifying syntax of said instruction to equivalent syntax and instruction insertion means for inserting a predetermined instruction at a position next to said instruction to be optimized.

4. A program transformation system for a microcomputer as set forth in claim 1, wherein said global optimization of the hamming's distance is performed by rearranging program modules.

5. A program transformation system for a microcomputer as set forth in claim 1, wherein optimization of said hamming's distance is obtained by making the hamming's distance to "1".

6. A program transformation system for a microcomputer as set forth in claim 1, which performs deletion of comment data, registering of label name in a label table, modifying the instruction into an intermediate code or registering a parameter name in a parameter name depending upon a result of parsing, and thereafter, temporary arrangement is performed.

7. A program transformation system for a microcomputer as set forth in claim 1, which further comprises outputting means for modifying the label, computing of real address and generating an object code from said intermediate code on the basis of content of modification of the program after termination of optimization.

8. A microcomputer for executing an object program transformed from a source program by temporary arrangement of program modules depending upon result of parsing of said source program, comprising:

storage means for storing said object program having optimized hamming's distance between addresses of respective instructions of the temporarily arranged program string, said object program being transformed from a source program according to the following steps:

computing hamming's distances between respective instructions of a temporarily arranged program string, optimizing hamming's distance of the instruction by modifying instruction corresponding to a portion of the program string having an address distance smaller than a predetermined value, and optimizing hamming's distance of the instruction by modifying instruction corresponding to a portion of the program string having an address distance greater than or equal to the predetermined value, and address generating means for sequentially generating addresses with optimized hamming's distances upon execution of the object program.

9. A microcomputer as set forth in claim 8, wherein said address generating means generates gray code on the basis of instruction read out from said storage means and performs addressing of a storage means with said gray code.

* * * * *